United States Patent
Zhang

(10) Patent No.: US 11,297,580 B2
(45) Date of Patent: Apr. 5, 2022

(54) TIMING METHOD FOR SYNCHRONIZATION SIGNAL BLOCK, AND RELATED PRODUCT

(71) Applicant: GUANGDONG OPPO MOBILE TELECOMMUNICATIONS CORP., LTD., Guangdong (CN)

(72) Inventor: Zhi Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 28 days.

(21) Appl. No.: 16/610,767

(22) PCT Filed: May 4, 2017

(86) PCT No.: PCT/CN2017/083039
§ 371 (c)(1),
(2) Date: Nov. 4, 2019

(87) PCT Pub. No.: WO2018/201391
PCT Pub. Date: Nov. 8, 2018

(65) Prior Publication Data
US 2020/0059876 A1 Feb. 20, 2020

(51) Int. Cl.
*H04W 56/00* (2009.01)
*H04L 5/00* (2006.01)
*H04L 27/26* (2006.01)

(52) U.S. Cl.
CPC ......... *H04W 56/001* (2013.01); *H04L 5/0048* (2013.01); *H04L 5/0053* (2013.01); *H04L 27/2613* (2013.01)

(58) Field of Classification Search
CPC .. H04W 56/001; H04L 5/0048; H04L 5/0053; H04L 27/2613
See application file for complete search history.

(56) References Cited

U.S. PATENT DOCUMENTS

| | | | |
|---|---|---|---|
| 2016/0277225 | A1 | 9/2016 | Frenne et al. |
| 2017/0064657 | A1 | 3/2017 | Chendamarai Kannan et al. |
| 2017/0094624 | A1 | 3/2017 | Balachandran et al. |
| 2017/0150461 | A1 | 5/2017 | Li et al. |
| 2019/0288899 | A1* | 9/2019 | Wang ............... H04L 5/0092 |

(Continued)

FOREIGN PATENT DOCUMENTS

| | | |
|---|---|---|
| CN | 102404071 | 4/2012 |
| CN | 104219757 | 12/2014 |
| CN | 105791201 | 7/2016 |

(Continued)

OTHER PUBLICATIONS

3GPP TSG RAN WG1 Meeting #87 Reno, USA, Nov. 14, 18, 2016.*

(Continued)

*Primary Examiner* — Brenda H Pham
(74) *Attorney, Agent, or Firm* — Hodgson Russ LLP

(57) ABSTRACT

A method for determining timing of a synchronization signal block (SS block) includes: receiving, by a user equipment, timing information of the SS block sent by a network apparatus; and determining, by the user equipment, timing of the SS block according to the timing information of the SS block. Embodiments of the present disclosure can be employed to achieve accurate timing for an SS block.

20 Claims, 7 Drawing Sheets

(56) References Cited

U.S. PATENT DOCUMENTS

2020/0053727 A1\* 2/2020 Zhang .................. H04W 84/12
2020/0059810 A1\* 2/2020 Harada ............. H04W 56/0015

FOREIGN PATENT DOCUMENTS

CN 107370699 11/2017
RU 2540891 2/2015

OTHER PUBLICATIONS

EPO, Office Action for EP Application No. 17908590.7, dated Mar. 16, 2020.
FSIP, Office Action for RU Application No. 2019138689-07, dated Jul. 17, 2020.
ISDEC, Office Action for CA Application No. 3063221, dated Jan. 4, 2021.
Ericsson, "SS burst set composition and SS time index indication," 3GPP TSG-RAN WG1 Meeting #88, R1-1702120, Feb. 2017, 4 pages.
Huawei et al., "NR Primary and Secondary Synchronization Signals Design," 3GPP TSG RAN WG1 Meeting #87, R1-1611261, Nov. 2016, 10 pages.
ITL, "On NR-SS structure and time indexing," 3GPP TSG RAN WG1 Meeting #88, R1-1703422, Feb. 2017, 6 pages.
WIPO, ISR for PCT/CN2017/083039, dated Jan. 29, 2018.
INAPI, Office Action for CL Application No. 201903125, dated Feb. 17, 2021.
IPI, Office Action for IN Application No. 201917048946, dated Jan. 29, 2021.
IPOS, Office Action for SG Application No. 11201910261X, dated Mar. 24, 2021.
Spreadtrum Communications, "Discussion on SS block mapping," 3GPP TSG RAN WG1 meeting #88bis, R1-1705156, Apr. 2017, 2 pages.
Motorola Mobility et al., "Discussion on SS block transmission," 3GPP TSG RAN WG1 Meeting #88bis, R1-1705549, Apr. 2017, 4 pages.
Ericsson, "SS Burst Set Composition," 3GPP TSG-RAN WG1 Meeting #88bis, R1-1706008, Apr. 2017, 6 pages.
KIPO, Office Action for KR Application No. 10-2019-7033487, dated Apr. 30, 2021.
JPO, Office Action for JP Application No. 2019-560708, dated May 21, 2021.
CNIPA, Office Action for CN Application No. 201780090272.7, dated May 24, 2021.
TIPO, First Office Action for TW Application No. 107114478, dated Jul. 16, 2021.
AT&T, "NR SS block and burst set composition and time Index Indication," 3GPP TSG RAN WG1 Meeting #88bis, R1-1704329, Apr. 2017.
AT&T, "NR SS Design: Burst Set Composition and SS Time Index Indication," 3GPP TSG RAN WG1 Meeting #88, R1-1702132, Feb. 2017.
Huawei et al., "Discussion on SS burst set composition and SS block time index indication," 3GPP TSG RAN WG1 Meeting #88bis, R1-1705052, Apr. 2017.
Nokia et al., "On Requirements and Design of SS Burst Set and SS Block Index Indication," 3GPP TSG-RAN WG1 Meeting #88, R1-1703092, Feb. 2017.
ZTE, "Composition of SS block, burst and burst set," 3GPP TSG RAN WG1 Meeting #88bis, R1-1704358, Apr. 2017.
CNIPA, Second Office Action for CN Application No. 201780090272.7, dated Dec. 14, 2021.
KIPO, Office Action for KR Application No. 10-2019-7033487, dated Nov. 29, 2021.
JPO, Office Action for JP Application No. 2019-560708, dated Jan. 14, 2022.
EPO, Communication for EP Application No. 17908590.7, dated Jan. 19, 2022.

\* cited by examiner

Configuration Mode 1

Configuration Mode 2

TIMING METHOD FOR SYNCHRONIZATION SIGNAL BLOCK, AND RELATED PRODUCT

CROSS-REFERENCE TO RELATED APPLICATION

This application is a U.S. national phase application of International Application No. PCT/CN2017/083039, filed May 4, 2017, the entire disclosure of which is incorporated herein by reference.

TECHNICAL FIELD

The present disclosure relates to the field of communication technologies, and more particularly, to a method for determining timing of a synchronization signal block, and related product.

BACKGROUND

A synchronization signal is a signal providing the same time reference to machine equipment that needs to process information synchronously. A Multi-beam system of new radio (NR)/5G covers an entire cell with different beams. Each beam corresponds to one synchronization signal block (SS block), wherein the SS block at least includes a primary synchronization signal (PSS), a secondary synchronization signal (SSS), and a physical broadcast channel (PBCH). The PBCH also contains a demodulation reference signal (DMRS) for demodulation.

Currently, in the discussion of the NR, an index of the SS block is carried in the PBCH. After user equipment (UE) detects one SS block and successfully demodulates the PBCH, the UE can obtain the index of the SS block. However, in some scenarios, even if the UE knows the index of the SS block, the UE still likely cannot know timing of the SS block at a symbol level and timing of the SS block at a subframe (SF) level. The UE needs to first obtain accurate timing (such as the timing at the symbol level and the timing at the SF level) to search for a cell. Therefore, how to obtain the accurate timing of the SS block for the UE is a technical problem to be solved.

SUMMARY

Embodiments of the present disclosure provide a method for determining timing of a synchronization signal block, and related product, which are employed to achieve accurate timing for an SS block.

According to a first aspect, the embodiments of the present disclosure provide a method for determining timing of a synchronization signal block (SS block), including:

receiving, by a user equipment (UE), timing information of the SS block sent by a network equipment; and determining, by the UE, timing of the SS block according to the timing information of the SS block.

According to a second aspect, the embodiments of the present disclosure provide a method for determining timing of a synchronization signal block (SS block), including:

transmitting timing information of the SS block by a network equipment to a user equipment (UE), the timing information of the SS block being used to determine timing of the SS block by the UE.

According to a third aspect, the embodiments of the present disclosure provide a user equipment (UE), which includes a processing unit and a communication unit.

The processing unit is configured to receive, via the communication unit, timing information of a synchronization signal block (SS block) sent by a network equipment.

The processing unit is further configured to determine timing of the SS block according to the timing information of the SS block.

According to a fourth aspect, the embodiments of the present disclosure provide a network equipment, which includes a processing unit and a communication unit.

The processing unit is configured to transmit timing information of a synchronization signal block (SS block) to a user equipment (UE) via the communication unit, wherein the timing information of the SS block is used to determine timing of the SS block by the UE.

According to a fifth aspect, the embodiments of the present disclosure provide a user equipment (UE), which includes: one or more processors, one or more memories, one or more transceivers, and one or more programs. The one or more programs are stored in the one or more memories, and are configured to be executed by the one or more processors, and the one or more programs include instructions for performing steps in the method according to the first aspect.

According to a sixth aspect, the embodiments of the present disclosure provide a network equipment, which includes: one or more processors, one or more memories, one or more transceivers, and one or more programs. The one or more programs are stored in the one or more memories, and are configured to be executed by the one or more processors, and the one or more programs include instructions for performing steps in the method according to the second aspect.

According to a seventh aspect, the embodiments of the present disclosure provide a computer-readable storage medium, storing a computer program for electronic data interchange, wherein the computer program enables a computer to perform the method according to the first aspect.

According to an eighth aspect, the embodiments of the present disclosure provide a computer-readable storage medium, storing a computer program for electronic data interchange, wherein the computer program enables a computer to perform the method according to the second aspect.

According to a ninth aspect, the embodiments of the present disclosure provide a computer program product, which includes a non-transitory computer-readable storage medium storing a computer program, wherein the computer program is executed, such that a computer is caused to perform the method according to the first aspect.

According to a tenth aspect, the embodiments of the present disclosure provide a computer program product, which includes a non-transitory computer-readable storage medium storing a computer program, wherein the computer program is executed, such that a computer is caused to perform the method according to the second aspect.

In this solution, the UE performs timing on the SS block based on the timing information sent by the network equipment. Compared with the prior art in which the SS block is timed only based on an SS block index, this solution can better obtain the accurate timing of the SS block.

These and other aspects of the present disclosure may become more readily apparent from the following description of the embodiments.

BRIEF DESCRIPTION OF THE DRAWINGS

To describe the technical solutions of the embodiments of the present disclosure or the prior art more clearly, the accompanying drawings required for describing the embodiments or the prior art will be briefly introduced below. Apparently, the accompanying drawings in the following description are merely some embodiments of the present disclosure. To those of ordinary skills in the art, other accompanying drawings may also be derived from these accompanying drawings without creative efforts.

DETAILED DESCRIPTION

To make a person skilled in the art better understand the solutions of the present disclosure, technical solutions in the embodiments of the present disclosure will be described clearly and completely below with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Detailed descriptions are given below, respectively.

The terms "first", "second", "third", and "fourth" used in the specification, the claims and the accompanying drawings of the present disclosure are used for distinguishing between different objects rather than describing a particular order. Furthermore, the terms "comprise" and "have" as well as variants thereof are intended to cover non-exclusive inclusion. For example, processes, methods, systems, products or devices comprising a series of steps or units are not limited to these listed steps or units. Alternatively, other steps or units that are not listed are also comprised, or alternatively, other steps or units inherent to these processes, methods, systems, products or devices are further comprised.

"Embodiments" herein mean that particular features, structures or characteristics described in conjunction with the embodiments may be included in at least one embodiment of the present disclosure. The phrase appearing in various places in the specification does not necessarily refer to the same embodiment, nor does it refer to an independent or alternative embodiment that is mutually exclusive with other embodiments. It is expressly and implicitly understood by those skilled in the art that the embodiments described herein may be combined with other embodiments.

The embodiments of the present disclosure are described below with reference to the accompanying drawings.

Figure 1:
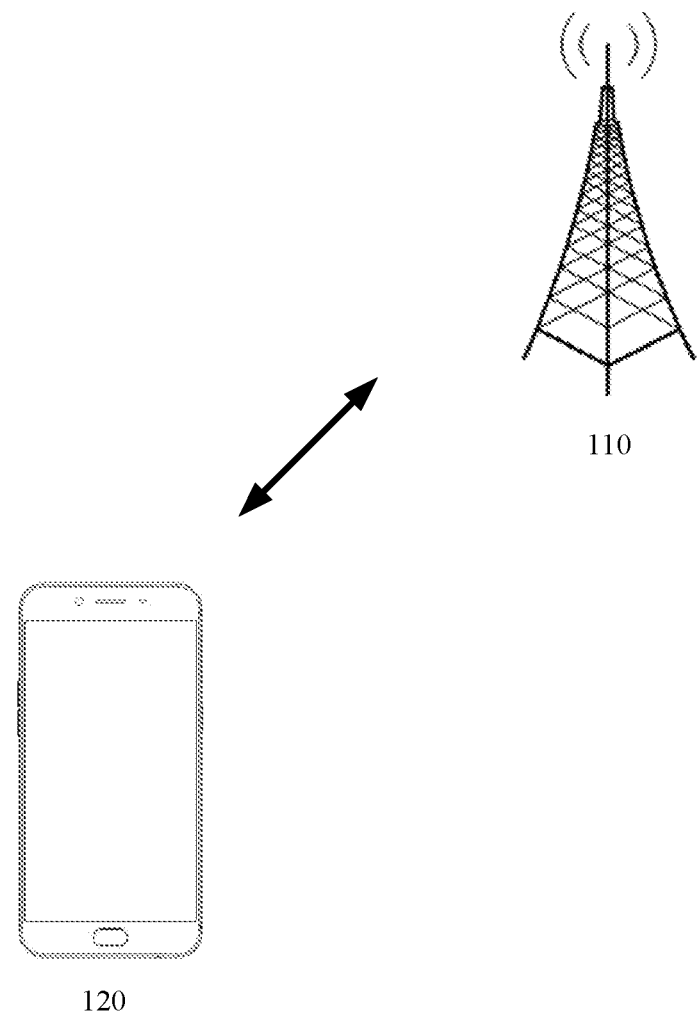
FIG. 1 is a schematic diagram of a network architecture according to an embodiment of the present disclosure.

Referring to FIG. 1, a schematic diagram of a network architecture according to an embodiment of the present disclosure is illustrated. The network architecture as shown in FIG. 1 includes a network equipment 110 and user equipment (UE) 120. The network equipment 110 sends timing information of an SS block to the UE 120. After receiving the timing information of the SS block sent by the network equipment 110, the UE 120 determines timing of the SS block according to the timing information of the SS block. As can be seen, in this solution, the SS block is timed based on the timing information sent by the network equipment. Compared with the prior art in which the SS block is timed only based on an SS block index, this solution can better obtain the accurate timing of the SS block.

As a device providing voice and/or data connectivity to a user, user equipment (UE) may be, for example, a handheld device having wireless connection functions, or a vehicle-mounted device, and the like. Common UE include, for example, mobile phones, tablet computers, laptops, palmtops, mobile internet devices (MID), wearable devices such as smart watches, smart bracelets, pedometers, and the like.

The network equipment refers to a node device of a network side. For example, the network equipment may be a radio access network (RAN) device on the access network side of a cellular network. As a device used for accessing the UE to a radio network, the RAN device includes but is not limited to: an evolved Node B (eNB), a radio network controller (RNC), a Node B (NB), a base station controller (BSC), a base transceiver station (BTS), a home base station (for example, Home evolved NodeB, or Home Node B, HNB), or a baseband unit (BBU). for another example, the network equipment may also be a node device in a Wireless Local Area Network (WLAN), such as an access controller (AC), a gateway, or a WIFI access point (AP), etc.

The method for determining timing of the synchronization signal block provided by the embodiment of the present disclosure is described in detail below with reference to the network architecture as shown in FIG. 1.

Figure 2A:
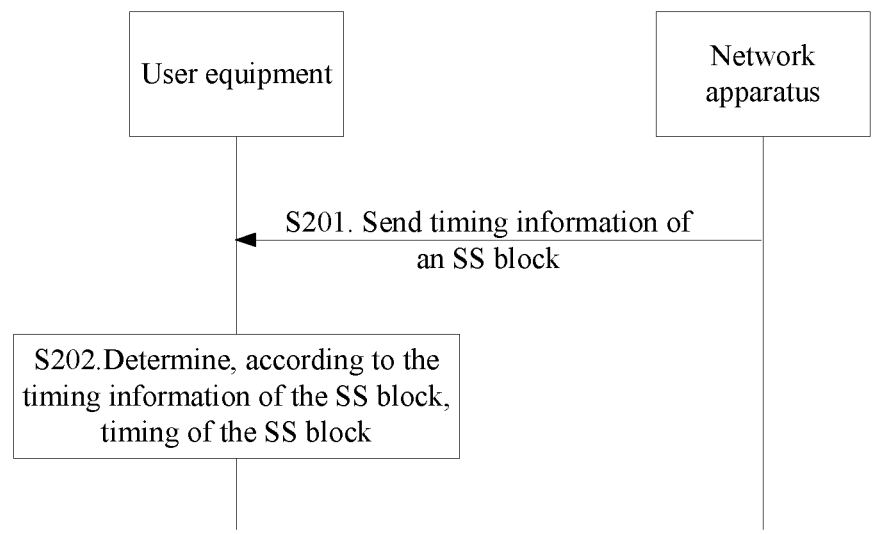
FIG. 2A is a schematic flow diagram of a method for determining timing of a synchronization signal block (SS block) according to an embodiment of the present disclosure.

Referring to FIG. 2A, a schematic flow diagram of a method for determining timing of a synchronization signal block (SS block) according to an embodiment of the present disclosure is illustrated, wherein the method includes following steps.

In Step S201, the network equipment transmits timing information of the SS block to the UE.

In one example, the timing information of the SS block is provided by the network equipment in a physical broadcast channel (PBCH) and/or minimal system information (minimal SI).

Specifically, the PBCH is a channel that can be first detected when the UE searches for a cell, and the network equipment provides the timing information of the SS block in the PBCH, such that the UE can obtain the timing information of the SS block within the shortest time, which is beneficial for the UE to save energy consumed in searching for the cell, and also is beneficial for the UE to simplify design of cell search. Otherwise, the UE necessarily obtains the timing of the SS block by detecting other channels.

In addition, in an existing 5G/NR system, information indispensable for the UE to make an initial cell search constitutes the minimal SI. The network equipment provides the timing information of the SS block to the UE through the minimal SI, which can save scheduling signaling. In addition, the timing information of the SS block may be obtained immediately when the UE makes the initial cell search.

In addition, relatively important partial information in the minimal SI is transmitted over the PBCH, and the remaining partial information is transmitted by other channels indicated by the PBCH. For example, the minimal SI includes information A and information B, wherein the information A is more important than the information B. The network equipment transmits the information A over the PBCH, and subsequently, the UE may obtain the information A by monitoring the PBCH. Additionally, the network equipment transmits indication information over the PBCH, wherein the indication information is used for indicating that the information B is transmitted over other channels (channels except the PBCH). Subsequently, the UE may obtain the indication information by monitoring the PBCH, and based on the indication information, the UE may learn that specifically in which channels the information B is transmitted. In addition, the relatively important partial information in the minimal SI may be determined by the network equipment according to different functions. For example, in the embodiments of the present disclosure, information carrying the timing information of the SS block is relatively important. Alternatively, the relatively important partial information in the minimal SI may be customized by the network equipment, and the like, which is not limited in the present disclosure.

In an example, the timing information of the SS block is provided by the network equipment over dedicated signaling. The dedicated signaling may be, for example, RRC reconfiguration signaling. As can be seen, accuracy of the timing information of the SS block may be ensured by transmitting the timing information of the SS block over the dedicated signaling.

In Step S202, the UE receives the timing information of the SS block sent by the network equipment, such that the UE determines timing of the SS block according to the timing information of the SS block.

In one example, the timing information of SS block includes at least one of:

1) a configuration mode of the SS block;
2) an index of the SS block;
3) a time domain position of the SS block included in a synchronization signal burst set (SS burst set);
4) a distance between two neighboring SS blocks in time-domain; and
5) the number of SS blocks contained in an SS burst set period.

It is to be noted that when the timing information of the SS block is provided by the network equipment over the PBCH and the timing information of the SS block includes at least two types of information among the above five types of information, the network equipment may broadcast the at least two types of information in the PBCH at the same moment, or the network equipment does not broadcast the at least two types of information in the PBCH at the same time, and the like, which is not limited in the present disclosure.

In addition, when the timing information of the SS block is provided by the network equipment in the minimal SI and the timing information of the SS block includes at least two types of information among the above five types of information, the network equipment carries the at least two types of information in one piece of information in the minimal SI simultaneously, or the network equipment does not carry the at least two types of information in one piece of information in the minimal SI simultaneously, and the like, which is not limited in the present disclosure.

In addition, when the timing information of the SS block is provided by the network equipment in the minimal SI and the minimal SI and the timing information of the SS block includes at least two types of information among the above five types of information, the network equipment carries a portion of the at least two types of information in the minimal SI, and broadcasts the remaining portion of the at least two types of information in the PBCH, etc., which is not limited in the present disclosure.

In an example, the configuration mode of the SS block is predetermined. The configuration mode of the SS block may be predetermined by the network equipment and the UE, or may be predetermined in a protocol, which is not limited in the present disclosure.

In an example, the configuration mode of the SS block is a position relationship of the SS block in the corresponding SS burst set in the time domain.

Figure 2B:
FIG. 2B is a schematic diagram of a configuration mode of an SS block according to an embodiment of the present disclosure.
Figure 2B:
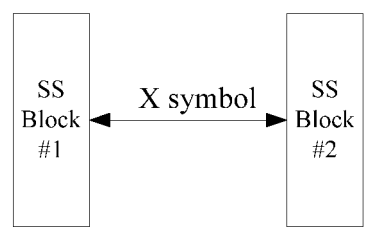
Figure 2B:
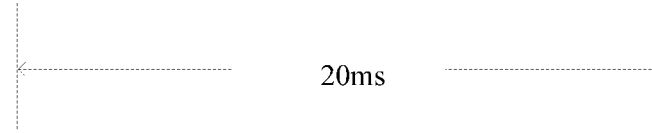
Figure 2B:
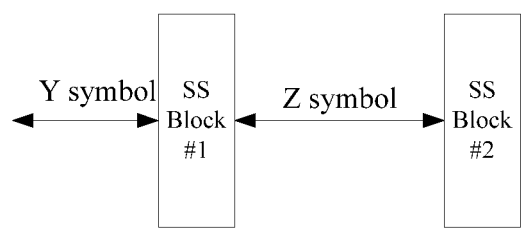

Specifically, as shown in FIG. 2B, within an SS burst set period such as 20 ms, supposing two SS blocks are included in an SS burst set period, possible configuration modes of the two SS blocks are limited. As shown in FIG. 2B, it is supposed that two SS blocks are included in an SS burst set period, and there are two configuration modes, i.e., a configuration mode 1 and a configuration mode 2. As shown in FIG. 2B, the position relationship of the SS block in the corresponding SS burst set in the time domain in the configuration mode 1 includes: a starting position of the SS block #1 coincides with a starting position of the SS burst set, and there are X OFDM symbols from a starting position of the SS block #2 to a termination position of the SS block #1, etc. The position relationship of the SS block in the corresponding SS burst set in the time domain in the configuration mode 2 includes: there are Y OFDM symbols from the starting position of the SS block #1 to the starting position of the SS burst set, and there are Z OFDM symbols from the starting position of the SS block #2 to the termination position of the SS block #1, etc.

It is to be noted that the above position relationship of the SS block in the corresponding SS burst set in the time domain is only an example, and a specific presentation manner of the position relationship of the SS block in the corresponding SS burst set in the time domain is not limited in the present disclosure.

For example, supposing two SS blocks are included in an SS burst set period such as 20 ms, the configuration mode of the SS block is the configuration mode 1 as shown in FIG. 2B, wherein the index of the SS block is denoted as SS Block #1, and the configuration mode 1 is predetermined in a protocol. After receiving the above information sent by the network equipment, the UE may learn the accurate timing of the SS block #1 according to the predetermined configuration mode 1 of the SS block. In addition, since the time-domain position relationship of the SS block #2 in the SS burst set is provided in the configuration mode 1 of the SS block, after obtaining the accurate timing of the SS block #1, the UE may obtain the accurate timing of the SS block #2 according to the accurate timing of the SS block #1, which speeds up the search for the SS block by the UE.

In one example, when the timing information of the SS block includes the time domain position of the SS block included in the corresponding SS burst set, the timing information of the SS block further includes a frame number of a frame at which the SS block is located, or the timing information of the SS block further includes a time domain position of a symbol at which to the SS block is located.

In one example, the time domain position of the symbol at which the SS block is located is used to define a time domain position of a symbol at which a starting position of the SS block is located, and/or the time domain position of the symbol at which the SS block is located is used to define a time domain position of a symbol at which a termination position of the SS block is located.

In one example, the frame number of the frame at which the SS block is located is used to define a frame number of a frame at which a starting position of the SS block, and/or the frame number of the frame at which the SS block is located is used to define a frame number of a frame at which a termination position of the SS block is located.

For example, in some cases, if the configuration mode of the SS block is predetermined, this may impose certain restrictions on the network equipment when configuring the synchronization signal. For example, in a 5G system, a time division duplexing (TDD) system is more common in high frequency bands. In the TDD system, the system needs to dynamically adjust the ratio of uplink frames to downlink frames according to different service types in the cell. Since the synchronization signal can only be sent on the downlink frame, if the configuration mode of the SS block is predetermined, this may impose restrictions on scheduling of the system.

Figure 2C:
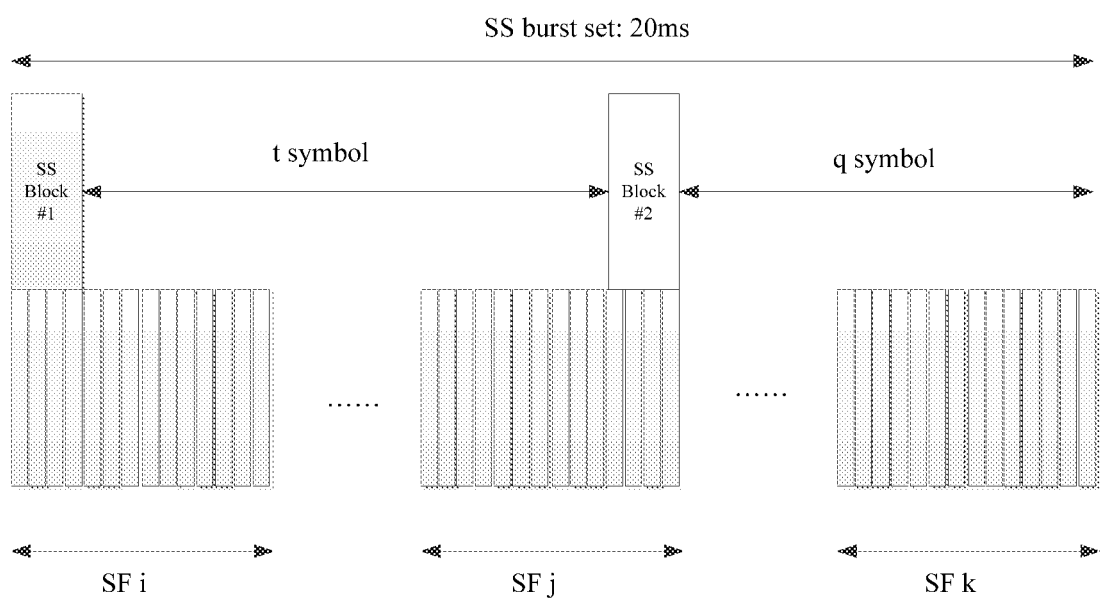
FIG. 2C is a schematic diagram of an SS burst set according to an embodiment of the present disclosure.

To avoid occurrence of the above situation, the network equipment may directly inform, in the PBCH or the minimal SI, the UE of the time domain position of the SS block included in the SS burst set. As shown in FIG. 2C, there are two SS blocks in an SS burst set having a period of 20 ms, wherein each SS block lasts four OFDM symbols in the time domain. The SS block #1 starts from the starting position of the SS burst set, and there are t OFDM symbols from the starting position of the SS block #2 to the termination position of the SS block #1 in the time domain. Taking FIG. 2C as an example, the symbol is a unit. The network equipment may directly inform, in the PBCH or minimal SI, the UE that the position of the SS block #1 in the SS burst set is 0, or the network equipment may directly inform, in the PBCH or minimal SI, the UE that the position of the SS block #2 in the SS burst set is t+4. As can be seen, the starting position of the SS block #2 is (t+4) OFDM symbols behind the starting position of the SS burst set. When receiving information indicating that the position of the SS block #1 in the SS burst set is 0, the UE may learn that the SS block #1 starts from the starting position of the SS burst set. Alternatively, when receiving information indicating that the position of the SS block #1 in the SS burst set is t+4, the UE may learn that the SS block #2 starts from the position of (t+4) OFDM symbols behind the starting position of the SS burst set.

Each SS block lasts duration of symbol in the time domain. For example, each of the above SS block lasts for four OFDM symbols in the time domain. Specific duration may be predetermined in the protocol, or may be contained in the timing information of the SS block, which is not limited in the present disclosure.

Sometimes, in addition to the time domain position of the SS block included in the SS burst set, the UE also needs to learn the position of the SS block in the entire frame structure. Therefore, in addition to informing the UE of the time domain position of the SS block included in the SS burst set, the network equipment may also inform, in the PBCH or minimal SI, the UE of the frame number of the SS block, such as an SF index (in the 5G system, one SF is defined as a time domain width of 1 ms). In FIG. 2C, the frame number of the SS block #1 is SF i, and the frame number of the SS block #2 is SF j. The frame number of the SS block may be defined as a frame number corresponding to the starting position of the SS block, or may be defined as the frame number corresponding to the termination position of the SS block. This definition is needed because some SS blocks may span across two SFs (the previous one and the latter one).

Alternatively, in addition to the time domain position of the SS block included in the SS burst set, the UE also needs to learn the time domain position of the symbol corresponding to the SS block. Therefore, in addition to informing the UE of the time domain position of the SS block included in the SS burst set, the network equipment may also inform, in the PBCH or minimal SI, the UE of the time domain position of the symbol corresponding to the SS block. In FIG. 2C, the symbol corresponding to the SS block #1 is from the first symbol to the fourth symbol, and the symbol corresponding to the SS block #2 is from the $(t+4)^{th}$ symbol to the $(t+8)^{th}$ symbol. The time domain position of the symbol corresponding to the SS block may be defined as the symbol corresponding to the starting position of the SS block, or may be defined as the symbol corresponding to the termination position of the SS block. This definition is needed because some SS blocks may span across two SFs (the previous one and the latter one).

For another example, in order to speed up the search for the SS block by the UE, the network equipment may also indicate, in addition to the time domain position of the SS block included in the SS burst set, the distance between two neighboring SS blocks in time-domain within the SS burst set corresponding to the SS block. For example, for the SS block #1 in FIG. 2C, the distance between two neighboring SS blocks in time-domain is t, which indicates that the SS block #2 is t OFDM symbols behind the termination position of the current SS block, such that after learning the exact timing of the SS block #1, the UE may learn the exact timing of the SS block #2.

In addition, if the SS block index is the SS block #2, this SS block is already the last SS block of the SS burst set corresponding to the SS block #2. In this case, there are two indication methods. According to the first indication method, no indication is made, or it is set to zero, indicating that the current SS block is already the last SS block of the SS burst set corresponding to the current SS block. According to the second indication method, it is indicated a time domain distance (i.e., the distance between the current SS block and the next SS block in time domain) from the current SS block to the first SS block of the next SS burst set. In FIG. 2C, the distance from the SS block #2 to the next SS burst set is q symbols, so the distance between two neighboring SS blocks in time-domain is q. Thus, after learning the exact timing of the SS block #2, the UE may learn the exact timing of the first SS block of the next SS burst set.

In this solution, the UE performs timing on the SS block based on the timing information sent by the network equipment. Compared with the prior art in which the SS block is timed only based on an SS block index, this solution can better obtain the accurate timing of the SS block.

Figure 3:
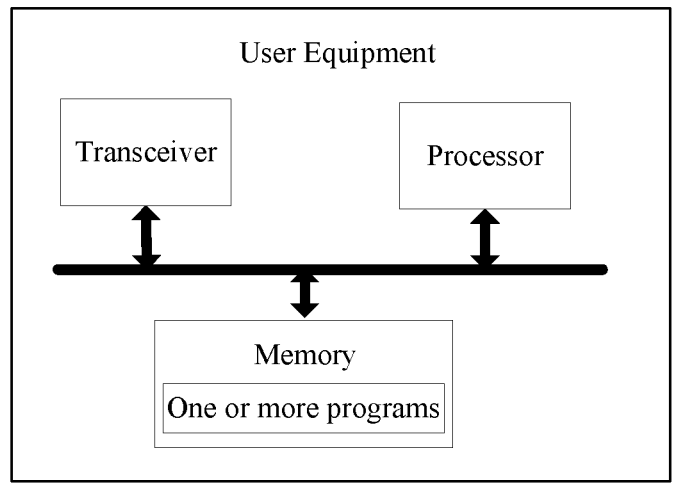
FIG. 3 is a schematic structural diagram of user equipment (UE) according to an embodiment of the present disclosure.

Consistent with the embodiment as shown in FIG. 2A, referring to FIG. 3, a schematic structural diagram of UE according to an embodiment of the present disclosure is illustrated. As shown in FIG. 3, the UE includes one or more processors, one or more memories, one or more transceivers, and one or more programs. The one or more programs are stored in the one or more memories, and are configured to be executed by the one or more processors, and the one or more programs include instructions for performing the following steps:

receiving timing information of a synchronization signal block (SS block) sent by a network equipment; and determining timing of the SS block according to the timing information of the SS block.

In one example, the timing information of the SS block includes at least one of:

1) a configuration mode of the SS block;
2) an index of the SS block;
3) a time domain position of the SS block included in a corresponding synchronization signal burst set (SS burst set); and
4) a distance between two neighboring SS blocks in time-domain.

In an example, the configuration mode of the SS block is predetermined.

In an example, the configuration mode of the SS block is a position relationship of the SS block in the corresponding SS burst set in the time domain.

In one example, when the timing information of the SS block includes the time domain position of the SS block included in the corresponding SS burst set, the timing information of the SS block further includes a frame number of the SS block, or the timing information of the SS block further includes a time domain position of a symbol corresponding to the SS block.

In one example, the time domain position of the symbol corresponding to the SS block is used to define a time domain position of a symbol corresponding to a starting position of the SS block, and/or the time domain position of the symbol corresponding to the SS block is used to define a time domain position of a symbol corresponding to a termination position of the SS block.

In one example, the frame number of the SS block is used to define a frame number corresponding to a starting position of the SS block, and/or the frame number of the SS block is used to define a frame number corresponding to a termination position of the SS block.

In one example, the timing information of the SS block is provided by the network equipment in a physical broadcast channel (PBCH) and/or minimal system information (minimal SI).

In this solution, the UE performs timing on the SS block based on the timing information sent by the network equipment. Compared with the prior art in which the SS block is timed only based on an SS block index, this solution can better obtain the accurate timing of the SS block.

Figure 4:
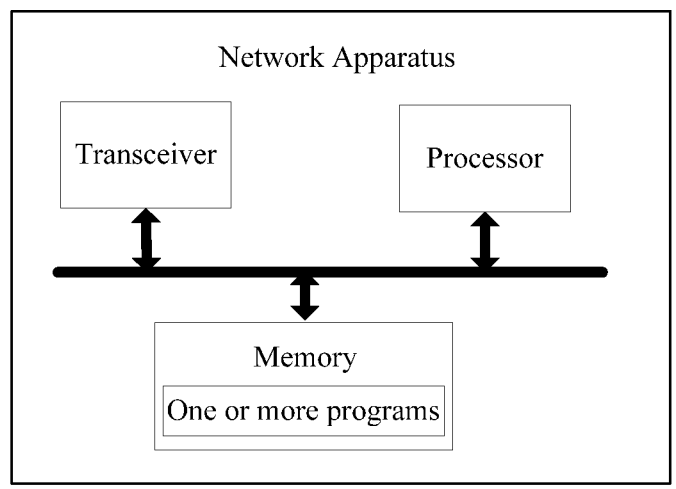
FIG. 4 is a schematic structural diagram of a network equipment according to an embodiment of the present disclosure.

Consistent with the embodiment as shown in FIG. 2A, referring to FIG. 4, a schematic structural diagram of a network equipment according to an embodiment of the present disclosure is illustrated. As shown in FIG. 4, the network equipment includes one or more processors, one or more memories, one or more transceivers, and one or more programs. The one or more programs are stored in the one or more memories, and are configured to be executed by the one or more processors, and the one or more programs include instructions for performing the following step:

transmitting timing information of a synchronization signal block (SS block) to user equipment (UE), the timing information of the SS block being used to determine timing of the SS block by the UE.

In one example, the timing information of the SS block includes at least one of:

1) a configuration mode of the SS block;
2) an index of the SS block;
3) a time domain position of the SS block included in a corresponding synchronization signal burst set (SS burst set); and
4) a distance between two neighboring SS blocks in time-domain.

In an example, the configuration mode of the SS block is predetermined.

In an example, the configuration mode of the SS block is a position relationship of the SS block in the corresponding SS burst set in the time domain.

In one example, when the timing information of the SS block includes the time domain position of the SS block included in the corresponding SS burst set, the timing information of the SS block further includes a frame number of the SS block, or the timing information of the SS block further includes a time domain position of a symbol corresponding to the SS block.

In one example, the time domain position of the symbol corresponding to the SS block is used to define a time domain position of a symbol corresponding to a starting position of the SS block, and/or the time domain position of the symbol corresponding to the SS block is used to define a time domain position of a symbol corresponding to a termination position of the SS block.

In one example, the frame number of the SS block is used to define a frame number corresponding to a starting position of the SS block, and/or the frame number of the SS block is used to define a frame number corresponding to a termination position of the SS block.

In one example, the timing information of the SS block is provided by the network equipment in a physical broadcast channel (PBCH) and/or minimal system information (minimal SI).

In this solution, the UE performs timing on the SS block based on the timing information sent by the network equipment. Compared with the prior art in which the SS block is timed only based on an SS block index, this solution can better obtain the accurate timing of the SS block.

The solutions provided by the embodiments of the present disclosure are primarily introduced above from the perspective of interactions between network elements. It is to be understood that to implement the above functions, the UE and the network equipment include corresponding hardware structures and/or software modules executing various functions. Those skilled in the art should readily appreciate that the present disclosure can be implemented by hardware or a combination of hardware and computer software in conjunction with units and arithmetic steps of various examples as described in the embodiments disclosed herein. Whether a certain function is executed in a hardware mode or a computer software mode depends on specific applications and design constraints on the technical solutions. Technical professionals may use different methods to implement functions as described in each of the specific applications. However, the implementation shall be not believed beyond the scope of the present disclosure.

In the embodiments of the present disclosure, functional unit division may be performed on the UE and the network equipment according to the foregoing method example. For example, each functional unit may be divided based on each function, or two or more functions may be integrated into one processing unit. The above integrated unit may be implemented either in the form of hardware or in the form of software program modules. It is to be noted that the division of the unit in the embodiments of the present disclosure is illustrative, which is merely a logical function division, and there may be other manners of division in actual implementations.

Figure 5:
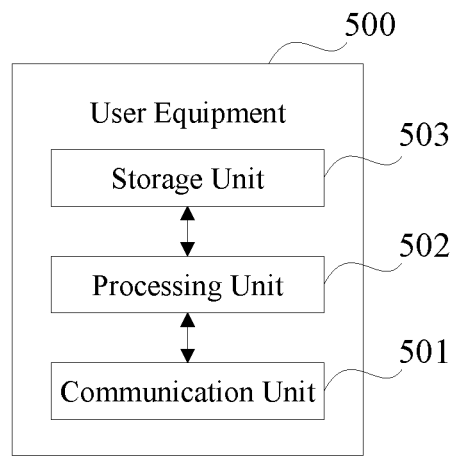
FIG. 5 is a schematic structural diagram of another UE according to an embodiment of the present disclosure.

In the case where integrated units or modules are used, FIG. 5 illustrates a composition block diagram of a possible functional unit of UE involved in the foregoing embodiment. The UE 500 includes a processing unit 502 and a communication unit 501. The processing unit 502 is configured to control and manage actions of the UE. For example, the processing unit 502 is configured to support the UE to perform Step 202 in FIG. 2 and/or other processes for the technologies described herein. The communication unit 501 is configured to support the UE to communicate with other devices, such as communication between the UE and the network equipment as shown in FIG. 4. The UE may further include a storage unit 503, which is configured to store program codes and data of the UE.

The processing unit 502 may be a processor or a controller. For example, the processing unit 502 may be a central processing unit (CPU), a general-purpose processor, a digital signal processor (DSP), an application-specific integrated circuit (ASIC), a field programmable gate array (FPGA), or other programmable logic devices, transistor logic devices, hardware components, or any combination thereof. The processor may implement or execute various exemplary logic blocks, modules, and circuits set forth in combination with the contents disclosed in the present disclosure. The processor also may be a combination of implementing the computing function, for example, a combination including one or more microprocessors, or a combination of the DSP and the microprocessor, etc. The communication unit 501 may be a transceiver, a transceiver circuit, a radio frequency (RF) chip, etc., and the storage unit 503 may be a memory.

When the processing unit 502 is a processor, the communication unit 501 is a communication interface, and the storage unit 503 is a memory, the UE involved in the embodiments of the present disclosure may be the UE as shown in FIG. 3.

Figure 6:
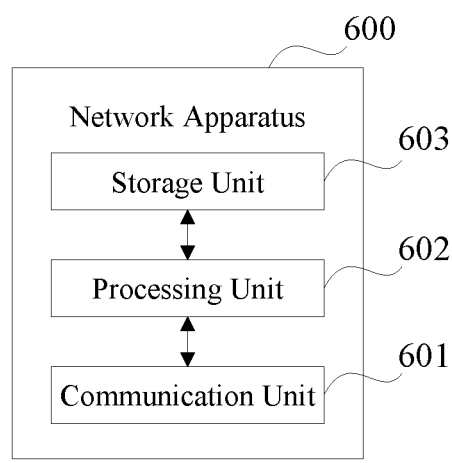
FIG. 6 is a schematic structural diagram of another network equipment according to an embodiment of the present disclosure.

In the case where integrated units are used, FIG. 6 illustrates a composition block diagram of a possible functional unit of UE involved in the foregoing embodiment. The network equipment 600 includes a processing unit 602 and a communication unit 601. The processing unit 602 is configured to control and manage actions of the network equipment. For example, the processing unit 602 is configured to support the network equipment to perform Step 201 in FIG. 2 and/or other processes for the technologies described herein. The communication unit 601 is configured to support the network equipment to communicate with other devices, such as communication between the network equipment and the UE as shown in FIG. 3. The network equipment may further include a storage unit 603, which is configured to store program codes and data of the network equipment.

The processing unit 602 may be a processor or a controller. For example, the processing unit 602 may be a CPU, a DSP, an ASIC, an FPGA, or other programmable logic devices, transistor logic devices, hardware components, or any combination thereof. The processor may implement or execute various exemplary logic blocks, modules, and circuits set forth in combination with the contents disclosed in the present disclosure. The processor also may be a combination of implementing the computing function, for example, a combination including one or more microprocessors, or a combination of the DSP and the microprocessor, etc. The communication unit 601 may be a transceiver, a transceiver circuit, etc., and the storage unit 603 may be a memory.

When the processing unit 602 is a processor, the communication unit 601 is a communication interface, and the storage unit 603 is a memory, the network equipment involved in the embodiments of the present disclosure may be the network equipment as shown in FIG. 4.

Figure 7:
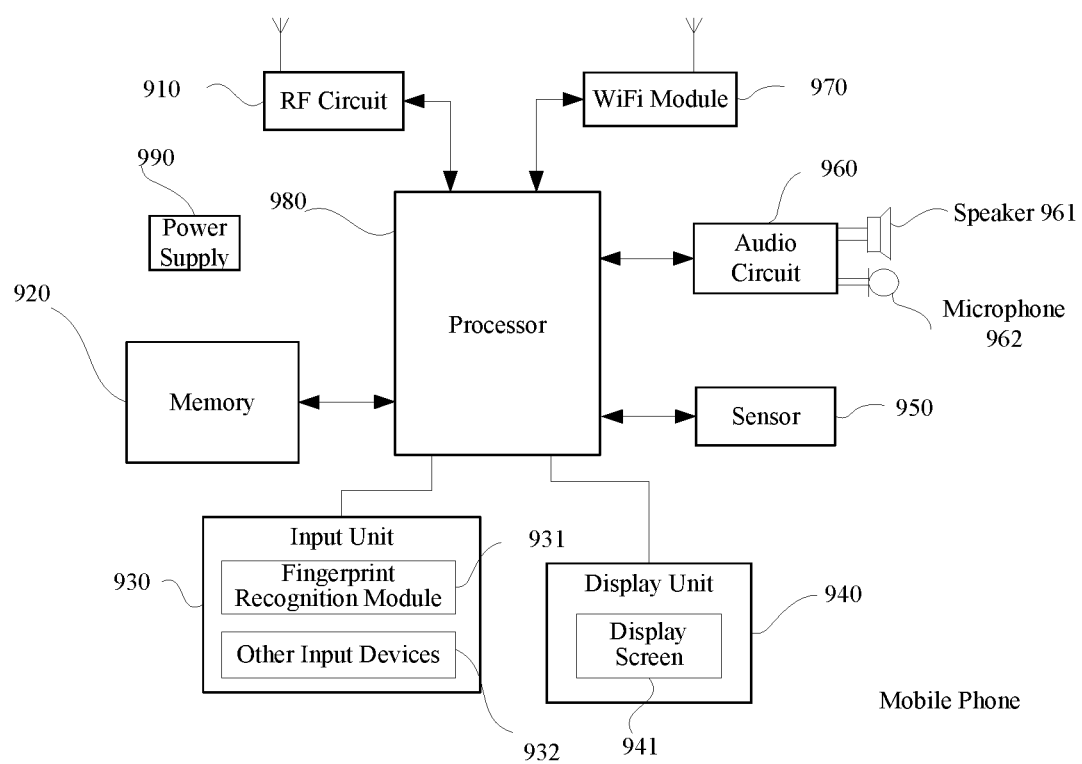
FIG. 7 is a schematic structural diagram of still another UE according to an embodiment of the present disclosure.

The embodiments of the present disclosure further provides another UE. As shown in FIG. 7, for the convenience of description, only portions related to the embodiments of the present disclosure are shown, and reference is made to method portions of the embodiments of the present disclosure for those portions whose specific technical details are not disclosed. The UE may be any UE such as a mobile phone, a tablet computer, a personal digital assistant (PDA), a point of sales (POS), a car computer, and the like. An example is taken where the UE is a mobile phone.

FIG. 7 illustrates a block diagram of a partial structure of the mobile phone related to the UE provided by an embodiment of the present disclosure. Referring to FIG. 7, the mobile phone includes: a radio frequency (RF) circuit 910, a memory 920, an input unit 930, a display unit 940, a sensor 950, an audio circuit 960, a wireless fidelity (WiFi) module 970, a processor 980, and a power supply 990, etc. Those skilled in the art may understand that the mobile phone structure as shown in FIG. 7 is not restrictive to the mobile phone, which may include more or less components than those in the figure, or a combination of some components, or different component arrangements.

The components of the mobile phone are described in detail below with reference to FIG. 7.

The RF circuit 910 may be configured to receive and transmit information. Generally, the RF circuit 910 includes, but is not limited to, an antenna, at least one amplifier, a transceiver, a coupler, a low noise amplifier (LNA), a duplexer and the like. Additionally, the RF circuit 910 may also communicate with a network or other devices via a wireless communication network. The wireless communication network may adopt any one of communication standards or protocols, including, but not limited to, Global System of Mobile communication (GSM), General Packet Radio Service (GPRS), Code Division Multiple Access (CDMA), Wideband Code Division Multiple Access (WCDMA), Long Term Evolution (LTE), email, Short Messaging Service (SMS) and the like.

The memory 920 may be configured to store software programs and modules, and the processor 980 performs various types of functional applications and data processes by executing the software programs and modules stored in the memory 920. The memory 920 may mainly include a program storage area and a data storage area, wherein the program storage area may store an operating system, application programs required for at least one function; and the data storage area may store data created according to the use of a mobile phone. Furthermore, the memory 920 may include a high speed random access memory, or further include a non-volatile memory, such as at least a magnetic disk storage device, a flash memory, or other volatile solid-state storage device.

The input unit 930 may be configured to receive inputted numerical or character information to generate key signal inputs related to user settings and function control of the mobile phone. Specifically, the input unit 930 may include a fingerprint recognition module 931 and other input devices 932. The fingerprint recognition module 931 may collect fingerprint data of the user. Besides the fingerprint recognition module 931, the input unit 930 may further include other input devices 932. Specifically, the other input devices 932 may include, but are not limited to, one or more of a touch screen, a physical keypad, functional buttons (such as volume control button, switch button and the like), a trackball, a mouse, an operating rod and the like.

The display unit 940 may be configured to display information inputted by the user or information provided to the user and various menus of the mobile phone. The display unit 940 may include a display screen 941. Alternatively, the display screen 941 may be configured using a liquid crystal display (LCD), an organic light-emitting diode (OLED) or the like. Although in FIG. 7, the fingerprint recognition module 931 and the display screen 941 realize the input and output functions as two independent components, they may be integrated together in some embodiments to realize the input and playback functions of the mobile phone.

The mobile phone may also include at least one sensor 950 such as a light sensor, a motion sensor and other sensors. Specifically, the light sensor may include an ambient light sensor and a proximity sensor. The ambient light sensor may adjust brightness of the display screen 941 according to intensity of the ambient light. The proximity sensor may turn off the display screen 941 and/or backlight when the mobile phone is close to the user's ear. As one type of motion sensor, an accelerometer sensor may detect values of accelerations in various directions (usually three axes), may detect a value and a direction of the gravitation when resting, and may be used in an application for recognizing a mobile phone pose (such as switching between a landscape mode and a vertical mode, corresponding games, pose adjusting with a magnetometer), functions related to vibration (such as a pedometer, knocking) recognition and the like. Other sensors such as a gyroscope, a barometer, a humidometer, a thermometer, an infrared sensor and the like which may be arranged in the mobile phone will not be described in detailed.

The audio circuit 960, a speaker 961, a microphone 962 may provide an audio interface between the user and the mobile phone. The audio circuit 960 may convert the received audio data into electric signals and transmit the electric signals to the speaker 961, and the speaker 961 may convert the electric signals into acoustical signals and output the acoustical signals. In another aspect, the microphone 962 may convert the collected acoustical signals into electric signals; the audio circuit 960 receives the electric signals and converts them into audio data; and the audio data are transmitted to the processor 980, and then the processed audio data are transmitted to another mobile phone via the RF circuit 910, or the audio data are transmitted to the memory 920 to be further processed.

WIFI is a short-range wireless transmission technology. The mobile phone may help the user to transmit or receive E-mail, browse web pages and access streaming media and the like through the WiFi module 970, which provides the user the wireless broadband internet access. Although the WiFi module 970 is shown in FIG. 7, it is to be understood that the WiFi module 970 is not a necessary component of the mobile phone, and may be omitted according to requirements within the scope without changing the substance of the present disclosure.

The processor 980 is a control center of the mobile phone using various interfaces and wires to connect respective portions of the whole mobile phone. By running or executing software programs and/or modules stored in the memory 920, calling data stored in the memory 920, and executing various functions of the mobile phone and processing data, the processor 980 proceeds overall monitoring to the mobile phone. Alternatively, the processor 980 may include one or more processing units. Preferably, the processor 980 may integrate application processors and modem processors, wherein the application processors may mainly process the operating systems, the user interfaces, the application programs and the like, and the modem processors may mainly process wireless communications. It is to be understood that, the above modem processors may not be integrated into the processor 980.

The mobile phone may also include the power supply 990 (for example, a battery) to supply power to respective component. Preferably, the power supply may be logically connected with the processor 980 through a power supply management system, thereby realizing functions of managing charging, discharging, and power consumption through the power supply management system.

Although not shown, the mobile phone may also include a camera, a Bluetooth module, etc., which are not described in detail.

In the foregoing embodiment as shown in FIG. 2, the flows on the UE in each step method may be implemented based on the structure of the mobile phone.

In the foregoing embodiment as shown in FIG. 5, each unit function may be implemented based on the structure of the mobile phone.

The embodiments of the present disclosure further provide a computer-readable storage medium storing a computer program for electronic data interchange, wherein the computer program enables a computer to perform some or all the steps described in the UE in the foregoing method embodiments.

The embodiments of the present disclosure further provide a computer-readable storage medium storing a computer program for electronic data interchange, wherein the computer program enables a computer to perform some or all the steps described in the network equipment in the foregoing method embodiments.

The embodiments of the present disclosure further provide a computer program product, which includes a non-transitory computer-readable storage medium storing a computer program, wherein the computer program is executed, such that a computer is caused to perform some or all the steps described in the UE in the foregoing method. The computer program product may be a software installation package.

The embodiments of the present disclosure further provide a computer program product, which includes a non-transitory computer-readable storage medium storing a computer program, wherein the computer program is executed, such that a computer is caused to perform some or all the steps described in the network equipment in the foregoing method embodiments. The computer program product may be a software installation package.

The steps of the method or algorithm set forth in the embodiments of the present disclosure may be implemented by way of hardware, or may be implemented by way of executing software instructions by the processor. The software instructions may be constituted by corresponding software modules, and the software modules may be stored in an random access memory (RAM), a flash memory, a read only memory (ROM), an erasable programmable ROM (EPROM), an electrically EPROM (EEPROM), a register, a hard disk, a mobile hard disk, a CD-ROM, or any other form storage media well known in the art. An exemplary storage medium is coupled to the processor, such that the processor can read/write information from/to the storage medium. Of course, the storage medium also may be a constituent part of the processor. The processor and the storage medium may host in an ASIC. Additionally, the ASIC may be located in an access network device, a target network device, or a core network device. Of course, the processor and the storage medium also may exist in the access network device, the target network device, or the core network device in the form of discrete components.

Those skilled in the art should realize that in the above one or more examples, the functions set forth in the embodiments of the present disclosure may be implemented, partly or entirely, by software, hardware, firmware, or any combination thereof. When implemented in software, these functions may be implemented, partly or entirely, in the form of a computer program product. The computer program product includes one or more computer instructions. When the computer program instructions are loaded and executed on a computer, the flows or functions according to the embodiments of the present disclosure may be generated, partly or entirely. The computer may be a general purpose computer, a special purpose computer, a computer network, or other programmable devices. The computer instructions may be stored in a computer-readable storage medium or transferred from one computer-readable storage medium to another computer-readable storage medium. For example, the computer instructions may be transferred from a website, a computer, a server or a data center to another website, computer, server, or data center by wire (e.g., coaxial cable, fiber optic, digital subscriber line (DSL)) or wirelessly (e.g., infrared, wireless, microwave, etc.). The computer-readable storage medium may be any available medium that can be accessed by a computer or a data storage device that includes one or more available media integrated server, data center, or the like. The available medium may be a magnetic medium (for example, a floppy disk, a hard disk, a magnetic tape), an optical medium (for example, a digital video disc (DVD)), or a semiconductor medium (for example, a solid state disk (SSD)).

The preceding embodiments further describe in detail the objectives, technical solutions, and beneficial effects of the embodiments of the present disclosure. It is to be understood that these embodiments are specific implementations of the embodiments of the present disclosure, and are not intended to limit the protection scope of the embodiments of the present disclosure. Any modifications, equivalent substitutions and improvements or the like made on the basis of the technical solutions of the embodiments of present disclosure shall fall within the protection scope of the embodiments of the present disclosure.

What is claimed is:

1. A method for determining timing of a synchronization signal block (SS block), comprising:
    receiving, by a user equipment (UE), timing information of the SS block sent by a network equipment; and
    determining, by the UE, timing of the SS block according to the timing information of the SS block;
    wherein the timing information of the SS block comprises a time domain position of the SS block comprised in a synchronization signal burst set (SS burst set), and a configuration mode of the SS block selected from a plurality of configuration modes, where the plurality of configuration modes correspond to different time domain position relationships of the SS block comprised in the SS burst set.

2. The method according to claim 1, wherein the timing information of the SS block further comprises at least one of:
    an index of the SS block; and
    a distance between two neighboring SS blocks in time-domain.

3. The method according to claim 2, wherein the configuration mode of the SS block is predetermined.

4. The method according to claim 2, wherein the configuration mode of the SS block is a time domain position relationship of the SS block in the SS burst set.

5. The method according to claim 2, wherein when the timing information of the SS block comprises the time domain position of the SS block comprised in the SS burst set, the timing information of the SS block further comprises a frame number of a frame at which the SS block is located, or the timing information of the SS block further comprises a time domain position of a symbol at which the SS block is located.

6. The method according to claim 5, wherein the time domain position of the symbol at which the SS block is located is used to define a time domain position of a symbol at which a starting position of the SS block is located, and/or the time domain position of the symbol at which the SS block is located is used to define a time domain position of a symbol at which a termination position of the SS block is located.

7. The method according to claim 5, wherein the frame number of the frame at which the SS block is located is used to define a frame number of a frame at which a starting position of the SS block, and/or the frame number of the frame at which the SS block is located is used to define a frame number of a frame at which a termination position of the SS block is located.

8. The method according to claim 1, wherein the timing information of the SS block is provided by the network equipment in a physical broadcast channel (PBCH) and/or minimal system information (minimal SI).

9. A method for determining timing of a synchronization signal block (SS block), comprising:
    transmitting timing information of the SS block by a network equipment to a user equipment (UE), the timing information of the SS block being used by the UE to determine timing of the SS block;
    wherein the timing information of the SS block comprises a time domain position of the SS block comprised in a synchronization signal burst set (SS burst set), and a configuration mode of the SS block selected from a plurality of configuration modes, where the plurality of configuration modes correspond to different time domain position relationships of the SS block comprised in the SS burst set.

10. The method according to claim 9, wherein the timing information of the SS block further comprises at least one of:
    an index of the SS block; and
    a distance between two neighboring SS blocks in time-domain.

11. The method according to claim 10, wherein the configuration mode of the SS block is predetermined.

12. The method according to claim 10, wherein the configuration mode of the SS block is a time domain position relationship of the SS block in the SS burst set.

13. The method according to claim 10, wherein when the timing information of the SS block comprises the time domain position of the SS block comprised in the SS burst set, the timing information of the SS block further comprises a frame number of a frame at which the SS block is located, or the timing information of the SS block further comprises a time domain position of a symbol a frame at which the SS block is located.

14. The method according to claim 13, wherein the time domain position of the symbol at which the SS block is located is used to define a time domain position of a symbol at which a starting position of the SS block is located, and/or the time domain position of the symbol at which the SS block is located is used to define a time domain position of a symbol at which a termination position of the SS block is located.

15. The method according to claim 13, wherein the frame number of the frame at which the SS block is located is used to define a frame number of a frame at which a starting position of the SS block, and/or the frame number of the frame at which the SS block is located is used to define a frame number of a frame at which a termination position of the SS block is located.

16. The method according to claim 9, wherein the timing information of the SS block is provided by the network equipment in a physical broadcast channel (PBCH) and/or minimal system information (minimal SI).

17. A user equipment (UE), comprising: one or more processors, one or more memories, one or more transceivers, and one or more programs, wherein the one or more programs are stored in the one or more memories, and are configured to be executed by the one or more processors, and the one or more programs comprise instructions for performing following steps:
receiving timing information of an SS block sent by a network equipment; and
determining, by the UE, timing of the SS block according to the timing information of the SS block;
wherein the timing information of the SS block comprises a time domain position of the SS block comprised in a synchronization signal burst set (SS burst set), and a configuration mode of the SS block selected from a plurality of configuration modes, where the plurality of configuration modes correspond to different time domain position relationships of the SS block comprised in the SS burst set.

18. The UE according to claim 17, wherein the timing information of the SS block further comprises at least one of:
an index of the SS block; and
a distance between two neighboring SS blocks in time-domain.

19. The UE according to claim 18, wherein the configuration mode used by the SS block is predetermined.

20. The UE according to claim 18, wherein the configuration mode of the SS block is a time domain positional relationship of the SS block in the SS burst set.

* * * * *